3,696,027
MULTI-STAGE DESULFURIZATION
Alan G. Bridge, El Cerrito, Calif., assignor to Chevron Research Company, San Francisco, Calif.
Continuation-in-part of application Ser. No. 743,568, July 9, 1968, now Patent No. 3,496,099, which is a continuation-in-part of application Ser. No. 668,046, Sept. 15, 1967, now abandoned. This application Jan. 12, 1970, Ser. No. 2,096
Int. Cl. C10g 23/02
U.S. Cl. 208—210
5 Claims

ABSTRACT OF THE DISCLOSURE

A process for hydrodesulfurization of a metals-contaminated heavy oil by the following steps carried out under hydroconverting conditions: (a) passing the heavy oil through a fixed bed of macroporous catalyst particles having high metals capacity and low desulfurization activity, (b) passing effluent from the macroporous catalyst bed through a fixed bed of moderately active desulfurization catalyst particles, and (c) passing effluent from the bed of moderately active desulfurization catalyst particles through a fixed bed of highly active desulfurization catalyst particles.

CROSS REFERENCES TO RELATED APPLICATIONS

This application is a continuation-in-part of my application Serial No. 743,568, (now U.S. Pat. No. 3,496,099) filed July 9, 1968, which is a continuation-in-part of Serial No. 668,046, filed September 15, 1967 (now abandoned). My application Ser. No. 2,097 titled Desulfurization, filed on Jan. 12, 1970, is closely related to the present application and is incorporated by reference into the present application. The two aforesaid parent applications and my closely related application titled Desulfurization are incorporated by reference into the present patent application.

BACKGROUND OF THE INVENTION

The present invention relates to hydrodesulfurization of hydrocarbons. More particularly, the present invention relates to multi-stage hydrodesulfurization of heavy oils contaminated with organometallic compounds.

A number of processes have been proposed for hydrodesulfurization of hydrocarbons and a large measure of success has been achieved in the hydrodesulfurization of relatively light oils. Heavier oils, especially residual oils, are more difficult to hydrodesulfurize. One of the more important reasons why heavy oils are relatively difficult to desulfurize is the frequent relatively high organometallic contaminant content present in heavy oils as compared to lighter oils. Organometallic compounds present in the heavy oils above concentrations of about 1 to 3 p.p.m., calculated as the metal by weight, causes relatively rapid deactivation of hydrodesulfurization catalysts, as these metals tend to deposit on the surface of the catalysts. Also, the metals present in the oil as soluble organometallic compounds tend to deposit out in the interstitial volume between catalyst particles contained in a fixed catalyst bed and therefore cause plugging problems; that is, high-pressure drop problems.

The more common of the metallic contaminants are iron, vanadium and nickel, often existing in concentrations in excess of 50 p.p.m. Other metals, including sodium, copper, etc., may also be present. These metals may exist within the hydrocarbon distillate and residuum fractions in a variety of forms; they may exist as metal oxides or as sulfides introduced therein as a form of metallic scale; they may be present in the form of soluble salts of such metals; usually, however, they are present in the form of high molecular weight organometallic compounds, including metal porphyrins, metal naphthenates, and the various derivatives of the porphyrins and naphthenes.

The forms the soluble metallic compounds may assume in oils, particularly residual oils, are not known with certainty. One general form for a metallic porphyrin may be represented as follows for iron:

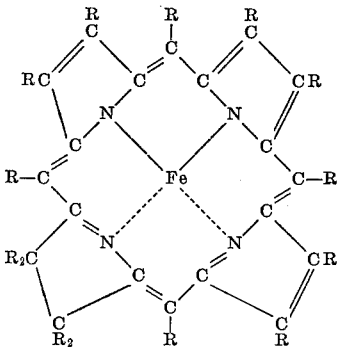

Another type of soluble organometallic compounds found in oils, particularly residual oils, are the metal naphthenates. One general form for the metal naphthenates may be represented as follows for iron:

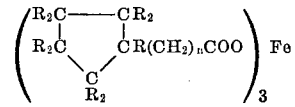

where $n$ may be zero but generally is an integer between 1 and 5, and R is hydrogen or an alkyl group.

Although metallic contaminants, existing as oxide or sulfide scale, may be removed, at least in part by a relatively simple filtering technique, and the water soluble salts are at least in part removable by washing and a subsequent dehydration procedure, a much more severe treatment is required to effect the destructive removal of the oganometallic compounds, particularly to the degree which is necessary to produce a heavy hydrocarbon fraction suitable for further processing.

Various processes have been proposed for the hydrodesulfurization of heavy oils which are contaminated with organometallic compounds. For example, U.S. Patent 2,771,401 is directed to a crude oil hydrodesulfurization process wherein spent silica-alumina cracking catalyst is used ahead of cobalt molybdenum catalyst in a second zone. Thus, according to a process of U.S. Patent 2,771,401, a feedstock to be desulfurized is passed into a first catalytic zone at a temperature within the range of 700° to 850° F. and containing a highly adsorptive material possessing some catalytic properties for hydrodesulfurization for petroleum hydrocarbons. The effluent from the first catalytic zone is then passed to a second catalytic zone where it is contacted with sulfactive catalyst to reduce its sulfur content. A desulfurized petroleum fraction is recovered as product from the second catalytic zone.

U.S. Patent 3,180,820 also is directed to a two-stage heavy oil hydrodesulfurization process. According to U.S. Patent 3,180,820, a heavy hydrocarbon oil containing metallic and sulfurous contaminants is desulfurized by passing the heavy oil and hydrogen at elevated pressure through a first hydrorefining zone containing a solid hydrogenation catalyst and maintained at a temperature in the range of about 700–850° F. to convert asphaltenes and metallic contaminants, and then passing at least the higher boiling fraction of the hydrocarbonaceous effluent containing sulfurous contaminants from said first zone together with hydrogen at elevated pressure through a second hydrorefining zone containing a solid hydrogenation catalyst and maintained at substantially the same temperature as said first zone to remove the sulfur contaminants.

Although various multi-stage processes have been proposed for hydrodesulfurization of heavy oils, these previously proposed processes have not adequately coped with the metals plugging problem of the first stage catalyst bed when the first stage is a fixed catalyst bed. U.S. Patent 3,180,820, for example, states that a fluidized bed is preferred in the two-stage desulfurization process discussed in that patent. However, a fluidized bed is not as efficient as a fixed catalyst bed and fluidized beds have certain mechanical operating problems which fixed catalyst beds do not. Accordingly, it would be desirable to use a fixed catalyst bed for the first stage if the metals plugging problems could be coped with.

SUMMARY OF THE INVENTION

According to the present invention, a process is provided for hydrodesulfurization of a metals-contaminated heavy oil which comprises: (a) passing the heavy oil, at elevated temperature and pressure, and in the presence of hydrogen, through a fixed bed of macroporous catalyst particles having high metals capacity and low desulfurization activity, (b) passing effluent from the macroporous catalyst bed, at elevated temperature and pressure, and in the presence of hydrogen, through a fixed bed of moderately active desulfurization catalyst particles, and (c) passing effluent from the bed of moderately active desulfurization catalyst particles, at elevated temperature and pressure, and in the presence of hydrogen, through a fixed bed of highly active desulfurization catalyst particles. Steps (a), (b), and (c) may be thought of as three catalytic zones.

The present invention is based upon several findings. In laboratory hydrodesulfurization test runs, it has been found that high active hydrodesulfurization catalyst deactivates, or fouls out, relatively rapidly when there is no metals removal or catalyst contacting operation applied to the metals-contaminated heavy oil feed prior to hydrodesulfurization of the heavy oil using the fixed bed. It has been determined that the use of a catalyst bed comprising macroporous catalyst to hydrotreat the heavy oil, prior to passing the heavy oil to the highly active hydrodesulfurization catalyst bed, results in a surprisingly high degree of sulfur removal over extended periods of time using the same amount or even less total catalyst than when only the highly active hydrodesulfurization catalyst is used. However, it was also determined that the first fixed catalyst bed, which contains the macropored catalyst and which serves to remove substantial quantities of metals from the heavy oil feed, tends to plug relatively rapidly, particularly when the first fixed bed catalyst has moderate or substantial desulfurization activity. This plugging of the first fixed catalyst bed tends to make the process economically unattractive because of power loss due to pressure drop and other operating difficulties resulting from considerably increased pressure drop across the first fixed catalyst bed. However, in accordance with the present invention, this problem is coped with by tailoring or grading the catalyst system. Certain types of tailored catalyst beds are described in some detail in my copending patent application, Ser. No. 743,568 (now U.S. Pat. No. 3,496,099), filed July 9, 1968, which patent specification is incorporated by reference into the present patent specification.

In the present invention, the feed is usually a heavy oil fraction, a substantial part of which boils above 900° F. The feed typically contains at least 1 p.p.m. metals and generally more than 4 p.p.m. metals, such as calcium, arsenic, sodium, iron, vanadium, and nickel. The present invention is particularly advantageously applied to hydrocarbon feedstocks containing one or more parts per million by weight of iron as oil soluble iron compounds.

The heavy oil fraction is passed through the first catalyst beds and contacted with the catalyst at elevated temperatures and pressures. Preferably, the temperatures are between 400°–900° F., and more preferably between 600°–850° F.; preferably the pressures are between 200 p.s.i.g. and 5000 p.s.i.g., and more preferably between 500 p.s.i.g. and 2000 p.s.i.g. If two serially connected reactors are employed, it is preferable to operate the first stage reactor at a lower temperature (e.g. 600 to 750° F.) than the second stage reactor (e.g. 650 to 850° F.). Because the present invention avoids rapid formation of a high pressure drop plug due to metals deposited at the top of the first or entrance catalyst bed, very high metals content feeds may be processed, such as resids containing several hundred parts per million metals.

My copending application titled Desulfurization, Ser. No. 2,097, filed on Jan. 12, 1970, is directed to the broad concept of demetalation and desulfurization using a tailored or graded catalyst bed ahead of a desulfurization catalyst bed. The present invention is directed to more particular embodiments concerned with demetalation and desulfurization using a catalytic system comprising graded catalyst beds. The graded catalyst beds contain relatively high-macroporosity catalyst particles down to low or nil macroporosity catalyst particles, and relatively low desulfurization activity catalyst particles down to high desulfurization activity catalyst particles.

The term "graded" is used herein to connote that the catalyst system or catalyst beds are composed of different types of catalyst particles with differing metals capacities and desulfurization activity to provide a fairly gradual change in capacity to retain (or "soak up") and to remove metals as well as a gradual change through the catalyst system in the direction of feed flow in terms of ability (desulfurization activity) to catalyze desulfurization reactions at a given temperature. Thus, a given bed may consist of a number of different types of catalyst particles in terms of physical properties and chemical composition, or particularly if a series of beds is used in the catalytical system, one or more given beds may be composed of a given type of catalyst particle, but with the types of catalyst particles being varied from bed to bed so as to provide a graded catalyst system. The graded catalyst system may be contained in one reactor vessel but preferably at least two serially connected reactors are used. The term "metals capacity" is used herein to mean the amount of metals which can be retained by the catalyst under standardized conditions of space velocity, temperature, pressure and pressure drop through a given bed of the given catalyst.

The term "macropore" is used herein to mean catalyst pores or channels or openings in the catalyst particle greater than about 500 A. in diameter. It is to be understood that the pores are usually irregular in shape and pore diameters are used to give a general idea of the size of the pore openings. The term "micropore" is used herein to mean pores having an opening less than 500 A. in diameter. More usually, however, micropores are within the range 10–150 A. in diameter.

In accordance with the process of the present invention, I have found that it is preferable to provide a catalyst system having decreasing macroporosity along the normal direction of feed flow through the serially connected catalyst beds or for the given catalyst bed in that instance where all three of the types of catalysts required in accordance with the present invention are contained in only one layered catalyst bed. The macroporosity has been found to be strongly directly related to the capacity of catalyst particles to retain metals removed from a heavy hydrocarbon feed contaminated with organometallic compounds. Also, the macroporosity of the catalyst has been found to be strongly related to the desulfurization activity of the catalyst particles.

Thus, in accordance with a preferred embodiment of the present invention, at least 30 volume percent of the pore volume of the macroporous catalyst used in the first required catalyst zone in the present invention is in the form of macropores, and it is preferred that the moderately active desulfurization catalyst used in the second required zone, according to the process of the present invention, contain between 5 and 40 volume percent of its pore volume in the form of macropores. Preferably, the moderately active desulfurization catalyst has at least 5 volume percent less pore volume in the form of macropores compared to the macropore pore volume of the macroporous catalyst used in the first required zone.

The catalyst used in the third zone required according to the process of the present invention is a highly active desulfurization catalyst preferably containing less than five volume percent of its pore volume in the form of macropores. More active and in general highly active desulfurization catalysts are more readily achieved by producing relatively high surface area catalysts consisting essentially entirely of micropores and preferably containing less than five volume percent of their pore volume in the form of macropores.

Most microporous catalyst with very high surface area have an average pore diameter below about 50 A. I have found, however, that in the process of the present invention, longer desulfurization run lengths are achieved by using highly active desulfurization catalyst particles having an average pore diameter of at least 50 A. and preferably of at least 80 A. Highly active desulfurization catalysts having an average pore diameter of at least 100 A. are particularly advantageous in the combination process of the present invention. By desulfurization run length is meant the length of time the desulfurization process can be operated while staying below an upper temperature limit but yet achieving the required amount of desulfurization of the heavy oil feed. Using highly active desulfurization catalyst particles having an approximately typical average pore diameter of about 30 to 50 A. desulfurization run lengths of only several hundred hours could be achieved for a given metals contaminated residuum feedstock. However, using the same catalyst composition for the highly active desulfurization catalyst, but manufacturing the catalyst so that it contains larger average pore openings still within the microporous range resulted in a manyfold increase in the desulfurization run length.

As indicated earlier, predominantly microporous catalysts are preferred in the third zone of the present process because the microporous catalysts have been found to have substantially higher catalytic activity for hydrodesulfurization of heavy oils compared to catalysts having lower surface areas and substantially or largely a macroporous pore structure. Particularly preferred catalysts for the third zone are catalyst composites comprising discrete substantially insoluble metal phosphate particles dispersed in a continuous phase matrix comprising at least one solid oxide and at least one hydrogenating component selected from Group VI-B metals and compounds thereof, and Group VIII metals and compounds thereof.

Particularly preferred hydrogenating components for the third zone catalyst are nickel, or compounds thereof, and molybdenum, or compounds thereof. Other somewhat similar catalyst composites which are particularly preferred are described in more detail in Ser. No. 671,994 (now U.S. Pat. No. 3,493,517) filed Oct. 2, 1967, which patent specification is incorporated by reference into the present patent specification. Catalysts prepared by cogelation of Group VI-B and VIII components together with an aluminum component are preferred for use in the third required zone relative to catalysts prepared by impregnation techniques.

There are several relative terms used in the present specification but these terms have distinct meaning as they are relative to the catalyst used within the defined process of the present invention. Thus, the catalyst particles used in what may be referred to as the first required zone of the present invention have low desulfurization activity and this term has distinct meaning relative to the catalyst used in what may be referred to as the second required zone of the present invention, as the catalyst in the second required zone is moderately active desulfurization particles, thus clearly indicating that the desulfurization catalyst particles in the second zone have somewhat greater desulfurization activity than those catalyst particles used in the first zone. Also, the catalyst used in the first zone is required to have a high metals capacity which usually is at least 0.2 gram of metal per cubic centimeter of catalyst and preferably 0.4 gram of metal per cubic centimeter of catalyst and, in any event, is a higher metals capacity than that of the catalyst used in the third zone of the present invention. The cubic centimeters of catalyst referred to herein are the cubic centimeters of volume which the catalyst particles occupy when placed in a reactor bed including the interstitial void volume between the catalyst particles.

DETAILED DESCRIPTION

Figure 1:
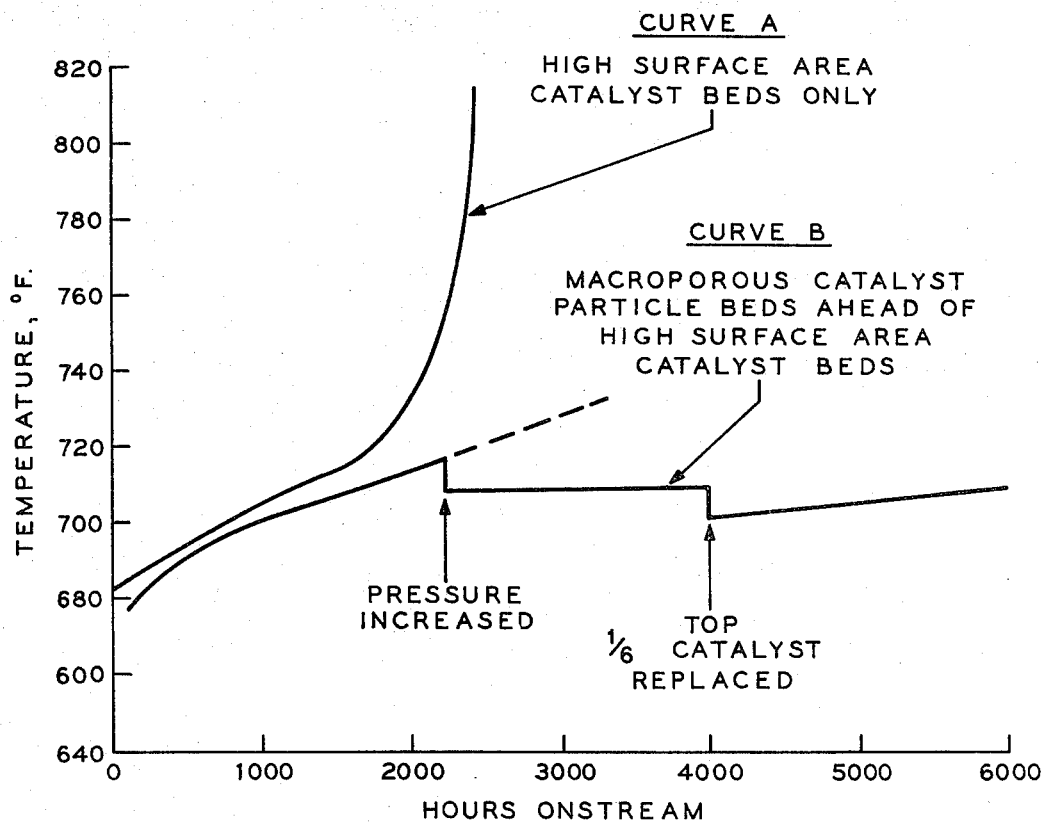
FIG. 1 is a graph showing the required temperature, as a function of time, to obtain a given amount of desulfurization of a residuum feed using one stage compared to a macroporous-microporous graded catalyst system.

The feed used in the runs plotted in FIG. 1 was an Arabian Light residuum having the following properties:

Sulfur: 3 weight percent
Boiling range: 650°–1200° F.+ residuum
Metals content: Ni: 7 p.p.m.; V: 26 p.p.m.; Fe: 6 p.p.m.
Gravity: 17.3 API For all the test runs, six reactors were used in series. The total amount of catalyst contained in the serially connected reactors was 780 cubic centimeters and the feed rate to the reactors was 780 cubic centimeters of residuum per hour for a liquid hourly space velocity of 1.0. The hydrogen gas rate to the reactors was about 2000 standard cubic feet per barrel of feed. The hydrodesulfurization operation was carried out on a constant basis of desulfurizing the residuum feed down to 1 percent product sulfur by weight with the temperature being raised, as necessary, to hold the product sulfur down to this level.

In the test run designated by Curve A in FIG. 1, all six reactors contained only high surface area catalyst. The catalyst composition was primarily molybdenum, titania, phosphate, and alumina. Preparation of this catalyst is described in Ser. No. 671,994 (now U.S. Pat. No. 3,493,517) referred to earlier. The surface area of this catalyst was over 100 m.²/g. and specifically was in the range of about 200 to 400 m.²/g. As can be seen from Curve A in FIG. 1, the catalyst completely deactivated or fouled out after about 2000 hours of operation. As can be seen from Curve A, the temperature necessary to achieve desulfurization down to 1 percent product sulfur went from about 720° F. to above 800° F. in only a few hundred hours, starting from the 1800 hour point on Curve A. It is believed that metals fouled the surface of the catalyst so that the catalyst had relatively low activity for desulfurization after about 2000 hours of operation. The average pore size for the catalyst was about 85 A. and the catalyst contained very few macropores.

The data for Curve A was obtained at an operating pressure of about 1400 p.s.i.g. with the hydrogen partial pressure being about 1100 p.s.i.g. The catalyst was 1/16 inch diameter extrudate.

In a test run using the same feed and desulfurizing down to the same level, much better results were obtained using macroporous catalyst ahead of the same high surface area microporous catalyst as was used in obtaining the data for Curve A. In this test run, which is illustrated graphically by Curve B in FIG. 1, the first two reactors contained nickel-molybdenum-silica-alumina catalyst particles prepared as described in U.S. Pat. 3,425,934, which patent is incorporated by reference into the present specification. This catalyst did not have a particularly low surface area, although the surface area was somewhat lower than that of the catalyst used in the second stage reactors. However, the nickel-molybdenum-silica-alumina catalyst used in the first stage reactors had a greater average pore diameter than that of the catalyst contained in the subsequent four reactors and contained about 30 percent of its pore volume in the form of macropores. Thus, the nickel-molybdenum-silica-alumina catalyst contained in the first two reactors had a greater metals capacity than the subsequent catalyst and was effective to prevent large quantities of metals from depositing out on the highly active desulfurization catalyst contained in the last four of the six serially connected reactors. As can be seen by Curve B in FIG. 1, a relatively long operating run was achieved by using the more porous nickel-molybdenum-silica-alumina catalyst ahead of the microporous highly active desulfurization catalyst. During the test run indicated by Curve B, the pressure was increased after about 2200 hours, but this pressure increase resulted in only a small improvement in catalyst activity. Also, it can be seen by the dotted extension of the first part of Curve B that a much longer length of operation can be achieved using the macroporous catalyst ahead of the highly active microporous catalyst, even without any pressure change during the run.

Figure 2:
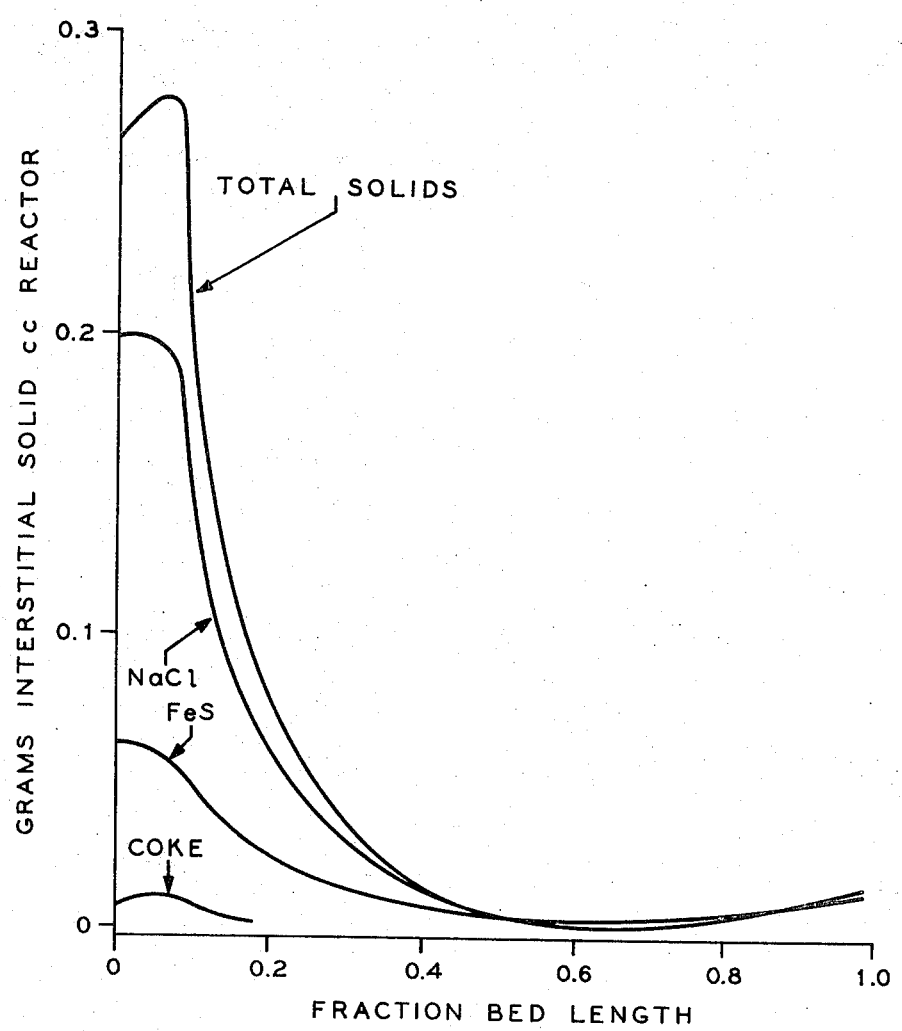
FIG. 2 is a metals plugging profile in a first-stage fixed catalyst bed after 4000 hours of operation.

However, after about 4000 hours of operation, plugging difficulties resulted in the first of the serially connected catalyst beds, particularly the very first of the two reactors containing the macroporous nickel-molybdenum-silica-alumina catalyst. The catalyst was removed from the first of the six reactors in series and the interstitial plug material located between the catalyst particles was analyzed for various segments of the catalyst bed. FIG. 2 graphically depicts the results of the analysis of the plugging material located between the particles in the first catalyst bed. As can be seen from FIG. 2, there was a very large amount of material on a relative basis at the uppermost part of the bed. In particular, there was a large amount of iron sulfide in between the catalyst particles in the first 20 percent of the catalyst bed in the first reactor. There also was a substantial amount of sodium chloride which had deposited out interstitially in the catalyst bed, but subsequent improved desalting techniques were developed to substantially reduce the problem due to sodium chloride. The iron sulfide plugging problem, however, could not be reduced by simple desalting techniques, as most of the iron compounds were present in the feed as soluble organometallic compounds. The type of plug which thus was required to be reduced in order to obtain satisfactory lengths of operation for desulfurization, without incurring rapidly increasing pressure drop in the first catalyst bed, or beds, was substantially the same as the metals plug which is handled successfully by tailoring the catalyst bed so as to provide increasing hydrogenation catalytic activity along the normal direction of residuum flow through the bed as described in more detail in my application Ser. No. 743,568 (now U.S. Pat. No. 3,496,099).

In the test run diagrammatically indicated by Graph B, one-third the catalyst in the first reactor of the six serially connected reactors was replaced with very porous alundum catalyst particles after about 4000 hours onstream time. The alundum particles were impregnated with vanadium and molybdenum hydrogenating components to increase the demetalation activity of the alundum particles. The term "activity" is used herein to mean the temperature at which a catalyst will affect a defined amount or given amount of demetalation, in the case of demetala- tion activity, or desulfurization, in the case of desulfurization activity, under standard conditions of pressure, space velocity, etc. The three types of catalysts used in the six serially connected reactors after 4000 hours onstream are summarized in Table I below:

TABLE I

| | Position | | |
|---|---|---|---|
| | Zone A, top ⅓ of 1st reactor | Zone B, bottom ⅔ of 1st reactor and all of 2d reactor | Zone C, all of reactors 3 through 6 |
| Volume of catalyst, cc | 43 | 217 | 520 |
| Type catalyst | (¹) | (²) | (³) |
| Catalyst composition, weight percent: | | | |
| Ni | | 5.95 | 8.2 |
| Mo | 3.0 | 18.5 | 14.3 |
| V | 3.5 | | |
| Al₂O₃ | 74.8 | 52.5 | 43.3 |
| SiO₂ | 15.2 | 13.0 | |
| P₂O₅ | | | 6.5 |
| TiO₂ | | | 10.0 |
| Total pore volume, cc./g | 0.395 | 0.6 | 0.612 |
| Volume percent pore volume: | | | |
| As macropore | 47.3 | 30 | 0 |
| As pores <500 A | 52.7 | 70 | 100 |
| Mean pore diameter, A | 260 | 110 | 100 |
| Surface area, m.²/g | 63 | 218 | 243 |

¹ Very macroporous, high metals capacity, low desulfurization activity.
² Moderate macroporous, good metals capacity, good desulfurization activity.
³ Microporous, low metals capacity, high desulfurization activity.

Using the three-zone catalyst system as indicated by Table I above helped considerably to reduce the tendency of a plug to develop due to interstitial metallic deposits at the top of the first catalyst bed. This is believed to be in part attributable to the relatively high metals capacity of the highly macroporous alundum catalyst used and because the alundum catalyst, even with the vanadium and molybdenum hydrogenating components, had substantially less desulfurization or hydrogenating activity than did the Zone B catalyst.

However, we have determined that a still further improvement in this type of operation is achieved by using a further zone of catalyst particles at the top of the first catalyst bed in the serially connected beds of catalyst. In particular, catalysts having less hydrogenating activity than the alundum impregnated with vanadium and molybdenum and catalysts and preferably having greater macroporosity than the alundum impregnated with vanadium and molybdenum are particularly advantageously employed at the entrance portion of the catalyst bed used in the process of the present invention. Catalyst particles consisting simply of highly macroporous alundum, alumina or other refractory inorganic oxide substantially free of Group VI-B or VIII hydrogenation components are advantageously used at or near the entrance to the catalytic system of the present invention. Highly macroporous contact particles consisting essentially only of alumina or alumina-silica have a relatively low hydrogenation activity but a high metals capacity and thus these catalysts aid in avoiding a metals interstitial plug near the entrance to the catalyst system.

Thus, according to a particularly preferred embodiment of the present invention, a process for the hydrodesulfurization of a metals-contaminated heavy oil is provided, which process comprises: (a) contacting the heavy oil, at elevated temperature and pressure, and in the presence of hydrogen, with a macroporous catalyst having at least 30 volume percent of its pore volume in the form of macropores and containing essentially no Group VI-B or Group VIII metals or metal compounds; (b) contacting effluent from step (a), at elevated temperature and pressure, and in the presence of hydrogen, with a macroporous catalyst having at least 15 volume percent of its pore volume in the form of macropores and containing at least one hydrogenating component selected from Group VI-B metals or metal compounds and Group VIII metals or metal compounds; (c) contacting effluent from step (b), at elevated temperature and pressure, and in the presence of hydrogen, with a catalyst having greater desulfurization activity than the catalyst used in step (b); and (d) contacting effluent from step (c), at elevated temperature and pressure, and in the presence of hydrogen, with a microporous catalyst having greater desulfurization activity than the catalyst used in step (c).

Although various specific embodiments of the invention have been described and shown, it is to be understood that they are meant to be illustrative only and not limiting. Certain features may be changed without departing from the spirit or essence of the invention. It is apparent that the present invention has broad application to the hydrodemetalization and hydrodesulfurization of hydrocarbons. Accordingly, the invention is not to be construed as limited to the specific embodiments illustrated but only as defined in the following claims.

I claim:

1. A process for hydrodesulfurization of a metals-containing heavy oil which comprises:
    passing the heavy oil at a temperature between 400° and 900° F. and a pressure between 200 and 5000 p.s.i.g. and in the presence of hydrogen through a first, second and third bed of catalyst particles,
    said first, second and third beds being characterized as follows:
    (1) said first bed comprises a fixed bed or macroporous catalyst particles having at least 30 volume percent of their pore volume in the form of macropores with a diameter above 500 angstroms, said first bed having a higher metals capacity than said second bed;
    (2) said second bed comprises a fixed bed of catalyst particles having between 5 and 40 volume percent of their pore volume in the form of said macropores,
    (3) said third bed comprises a fixed bed of catalyst particles containing less than 5 volume percent of its pore volume in the form of said macropores,
    (4) said catalyst particles in said third bed having a higher desulfurization activity than said catalyst particles in said second bed and said catalyst particles in said second bed having a higher desulfurization activity than said catalyst particles in said first bed, whereby said first, second and third beds provide progressively more active desulfurization catalysts along the normal direction of feed flow.

2. A process in accordance with claim 1 wherein the average diameter of the pores in the catalyst particles in said third bed is at least 50 angstroms.

3. A process in accordance with claim 1 wherein the average diameter of the pores in the catalyst particles in said third bed is at least 80 angstroms.

4. A process in accordance with claim 1 wherein said third bed contains catalyst composites comprising discrete, substantially insoluble metal phosphate particles dispersed in a continuous-phase matrix comprising at least one solid oxide and at least one hydrogenating component selected from Group VI–B metals and compounds thereof and Group VIII metals and compounds thereof.

5. A process for hydrodesulfurization of a metals-contaminated heavy oil which comprises:
    (a) contacting the heavy oil at a temperature between 400° and 900° F. and a pressure between 200 and 5000 p.s.i.g. with hydrogen and with a macroporous catalyst having at least 30 volumes percent of its pore volume in the form of macropores with a diameter above 500 angstroms and containing essentially no Group VI–B or Group VIII metals or metal compounds thereof;
    (b) contacting the effluent from step (a) at a temperature between 600° and 850° F. and a pressure between 200 and 5000 p.s.i.g. with hydrogen and with a macroporous catalyst having at least 15 volume percent of its pore volume in the form of said macropores and containing at least one hydrogenating component selected from Group VI–B metals or metal compounds thereof and Group VIII metals or metal compounds thereof;
    (c) contacting the effluent from step (b) at a temperature between 600° and 850° F. and a pressure between 200 and 5000 p.s.i.g. with hydrogen and with a hydrodesulfurization catalyst having greater desulfurization activity than the catalyst used in step (b); and
    (d) contacting the effluent from step (c) at a temperature between 600° and 850° F. and a pressure between 200 and 5000 p.s.i.g. with hydrogen and with hydrodesulfurization catalyst comprising a microporous catalyst having greater desulfurization activity than the catalyst used in step (c);
    whereby said first, second, third, and fourth catalysts provide progressively more active desulfurization catalyst compositions along the normal direction of feed flow.

References Cited
UNITED STATES PATENTS

| | | | |
|---|---|---|---|
| 3,425,810 | 2/1969 | Scott, Jr. | 208—210 |
| 3,294,659 | 12/1966 | O'Hara | 208—89 |
| 3,530,066 | 9/1970 | Kuwata et al. | 208—210 |
| 3,519,557 | 7/1970 | Pruiss | 208—210 |
| 3,546,103 | 12/1970 | Hamner et al. | 208—211 |
| 2,902,429 | 9/1959 | Scott | 208—253 |
| 3,365,389 | 1/1968 | Spars et al. | 208—89 |
| 3,544,452 | 12/1970 | Jaffe | 208—216 |
| 3,563,886 | 2/1971 | Carlson et al. | 208—210 |

DELBERT E. GANTZ, Primary Examiner

G. J. CRASANAKIS, Assistant Examiner

U.S. Cl. X.R.

208—251 H